United States Patent [19]
Lohse et al.

[11] Patent Number: 6,114,443
[45] Date of Patent: Sep. 5, 2000

[54] POLYOLEFIN BLENDS COMPATIBILIZED WITH A DIBLOCK COPOLYMER

[75] Inventors: David John Lohse, Bridgewater, N.J.; Henry Wu-Hsiang Yang, Kingwood, Tex.

[73] Assignee: Exxon Research and Engineering Co., Florham Park, N.J.

[21] Appl. No.: 08/881,011

[22] Filed: Jun. 23, 1997

Related U.S. Application Data

[63] Continuation-in-part of application No. 08/698,617, Aug. 16, 1996, abandoned, which is a continuation of application No. 08/416,266, Apr. 14, 1995, abandoned.

[51] Int. Cl.[7] ............................ C08L 53/00; C08L 23/04; C08L 23/12
[52] U.S. Cl. ............................ 525/88; 525/95; 525/240
[58] Field of Search ........................................ 525/88, 95

[56] References Cited

U.S. PATENT DOCUMENTS

| | | | |
|---|---|---|---|
| 3,487,128 | 12/1969 | Okazaki et al. | 260/876 |
| 3,627,852 | 12/1971 | Aishima et al. | 260/876 B |
| 3,632,674 | 1/1972 | Aishima et al. | 260/876 B |
| 4,251,646 | 2/1981 | Smith, Jr. | 525/88 |
| 5,147,933 | 9/1992 | Koizumi et al. | 525/89 |
| 5,391,629 | 2/1995 | Turner | 525/268 |

FOREIGN PATENT DOCUMENTS

WO91/12285  8/1991  WIPO.

OTHER PUBLICATIONS

Alger, "Polymer Science Dictionary", 2nd ed., Chapman & Hall, New York, pp. 31, 274 (1997).

Encyclopedia of Polymer Science and Engineering, vol. 6, Wiley & Sons, 1986, p. 455.

*Primary Examiner*—Donald R. Wilson
*Attorney, Agent, or Firm*—Gerard J. Hughes; Kenneth W. Peist

[57] ABSTRACT

The present invention is based on the discovery that diblock copolymers of ethylene and an atactic alpha-olefin that are prepared in the presence of a catalyst system comprising at least one metallocene compound and a non-coordinating anion are especially useful as compatibilizers with blends of polyethylene and isotactic poly-alpha-olefin homopolymers.

5 Claims, No Drawings

POLYOLEFIN BLENDS COMPATIBILIZED WITH A DIBLOCK COPOLYMER

CROSS REFERENCE TO RELATED APPLICATION

This application is a continuation-in-part of U.S. patent application Ser. No. 08/698,617 filed Aug. 16, 1996, which is a rule 60 continuation of U.S. patent application Ser. No. 05/416,266, filed Apr. 14, 1995 and now abandoned.

FIELD OF THE INVENTION

The present invention relates to improved blends of different polyolefins such as blends of polyethylene and polypropylene.

BACKGROUND OF THE INVENTION

Most pairs of polymers are immiscible in one another. This is a direct consequence of their macromolecular nature. Since there is a strong commercial incentive to make useful materials from mixtures of various polymers, there has been a great deal of activity in the area of improving the compatibility of such immiscible, multiphase systems. For example, blends of different polyolefins are made in many different combinations and compositions with the use of compatibilizers. Although in principle graft and block copolymers made by a variety of techniques are useful as compatibilizers, graft copolymers are most commonly used, in part, because true block copolymer presently exist for only a small number of the possible pairs of monomers. Consequently, for most blends there is no corresponding true block copolymer that might be useful as a compatibilizer. Also, experience has shown that many block copolymers display low levels of compatibilizing efficiency.

The use of ethylene-alpha olefin copolymers to compatibilize polyethylene and poly alphaolefin homopolymers is known in the art. However, these copolymers have isotactic poly alphaolefin segments such as isotactic polypropylene. Consequently, there is a need for copolymer compatibilizers of polyethylene and atactic poly alpha-olefins.

SUMMARY OF THE INVENTION

The present invention is based on the discovery that diblock copolymers of polyethylene and atactic poly alpha olefins that are prepared in the presence of a catalyst system comprising at least one metallocene compound and a non-coordinating anion are especially useful compatibilizers for blending polyethylene and an atactic or isotactic poly alpha-olefin homopolymer.

Thus, in one embodiment of the present invention there is provided a composition comprising a blend of polyethylene and an atactic or isotactic poly alpha-olefin homopolymer and a diblock copolymer compatibilizer of ethylene and an atactic alpha olefin, the atactic diblock copolymer having terminal unsaturation, at least 30% of which is vinylidene unsaturation. In a particularly preferred embodiment of the invention, the composition comprises a blend of polyethylene and polypropylene, and in which composition the compatibilizer is a diblock copolymer of polyethylene and atactic polypropylene.

DETAILED DESCRIPTION OF THE INVENTION

The compositions of the present invention include blends of polyethylene and a second polyolefin of atactic or iso-tactic tacticity. The polyolefins suitable for blending include those olefins prepared from olefins monomers having from 2 to about 16 carbon atoms. Particularly preferred blends in accordance with the present invention include blends of polyethylene and polypropylene and polyethylene and polybutylene. In the present invention, the ratio of the different polyolefins, e.g., the ratio of polyethylene to the second polyolefin, such as polyethylene to polypropylene, is not critical and may vary broadly. For example, it may range from 95:5 to about 5:95.

The compositions from the present inventions also include a diblock copolymer of ethylene and an atactic alpha olefin having from about 3 to about 16 carbon atoms. In the practice of the present invention, it is particularly preferred that the atactic alpha olefin constituent of the diblock copolymer be based upon the same monomer as one of the two polyolefins in the blend. So, for example, in a blend of polyethylene and polypropylene, preferably the diblock copolymer will be an ethylene-atactic propylene diblock copolymer.

Importantly, the ethylene-atactic alpha olefin diblock copolymer will possess terminal unsaturation. It is not necessary, however, that all of the unsaturation in the copolymer be terminal unsaturation, although it is preferred that at least 50% of the unsaturation of the polymer and preferably at least 70% of the unsaturation in the polymer be terminal unsaturation. Additionally, it is particularly preferred that at least 30% and preferably 50% of the terminal unsaturation be vinylidene unsaturation.

The ethylene-atactic alpha olefin diblock copolymer generally will possess a number average molecular weight of between about 10,000 to about 1,000,000 and preferably between about 100,000 to about 500,000. Also, in general, each block of the copolymer will possess a minimum of between about 25,000 to 500,000 and preferably between 50,000 to about 250,000.

The ratio of ethylene to atactic alpha olefin in the diblock copolymer may vary broadly; however, for best results it is preferred that the ratio be substantially similar to the ratio of the polyolefins being blended.

Ethylene-atactic alpha olefin copolymers having the foregoing properties can be prepared by sequentially polymerizing an alpha olefin having from 3 to about 16 carbon atoms and preferably 3 to 4 carbon atoms and then ethylene in the presence of a catalyst system comprising at least one metallocene (e.g., a cyclopentadienyl transition metal compound) and a compatible non-coordinating anion such catalyst systems are described in U.S. Pat. No. 5,391,629, incorporated herein by reference. The comonomer content of the copolymer can be controlled through the selection of the metallocene catalyst component and by controlling the amount of the various monomers introduced into the reaction vessel.

The catalysts employed in the production of the preferred polymers are organometallic coordination compounds which are cyclopentadienyl derivatives of a Group IVB metal of the Periodic Table of the Elements (56th Edition of the "Handbook of Chemistry and Physics", CRC Press (1975)) and include mono, di and tri cyclopentadienyls and their derivatives of the transition metals. Particularly preferred catalysts are represented by the formulae:

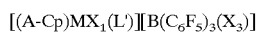

wherein: M is titanium, zirconium or hafnium; (A-Cp) is either (Cp) (Cp*) or Cp-A'-Cp*; and Cp and Cp* are the same or different substituted or unsubstituted cyclopendaienyl radicals; A' is a covalent bridging group containing a Group IVA element; L' is a neutral Lewis base; $X_1$ is a hydride radical, hydrocarbyl radical having from 1 to about 20 carbon atoms, substituted-hydrocarbyl radical, wherein 1 or more of the hydrogen atoms are replaced with a halogen atom, having from 1 to about 20 carbon atoms, or organometalloid radical comprising a Group IVA element wherein each of the hydrocarbyl substituents contained in the organo portion of said organo-metalloid, independently, contain from 1 to about 20 carbon atoms; $X_3$ is a hydride, halide, hydrocarbyl radical, a $C_1$–$C_{20}$ hydrocarbyl radical wherein one or more of the hydrogen atoms is replaced by a halogen atoms, organometalloid radical wherein each hydrocarbyl substitution in the organo portion contains from 1 to 20 carbon atoms and the metal is a Group IVA metal and B' is a noncoordinating anion.

The compositions of the present invention will typically contain from about 90 to 99.5 wt % of the two different polyolefins, the balance being the atactic block copolymer compatibilizer. Stated differently, the compatibilizers typically will be present in the composition in the range of from about 0.5 wt % to about 10 wt % and preferably about 3 wt %.

In cases where the atactic di-block copolymers of the present invention are polypropylene-polyethylene copolymers, the polypropylene blocks are atactic, in contrast to polypropylene-polyethylene compatibilizers known in the art wherein the polypropylene blocks are isotactic. It is believed that isotactic polypropylene-polyethylene diblock copolymer compatibilizers can compatibilize isotactic polypropylene-polyethylene homopolymer blends because the copolymer's polypropylene segments can condense in blend's crystalline isotactic polypropylene regions.

According to this compatibilization model, atactic polypropylene-polyethylene diblock copolymers should not function as such a compatibilizer because the diblock's atactic polypropylene segments would not be able to condense in the isotactic polypropylene region of a polyethylene-isotactic polypropylene homopolymer blend. It was therefore, greatly surprising that ethylene-atactic polypropylene diblock copolymers did function as effective compatibilizers as set forth in the examples.

While not wishing to be bound by any theory, it is believed that the atactic polypropylene portions of the di-block copolymers of this invention condense in the amorphous inter-lamellar phase of the isotactic polypropylene homopolymer of a polypropylene-polyethylene blend thereby compatibilizing the blend.

EXAMPLE 1

In this example, a blend of polypropylene and polyethylene, was prepared using a diblock copolymer of polyethylene and atactic polypropylene as a compatibilizer.

A. Preparation of the Compatibilizer

To a 1-liter autoclave reactor was added at room temperature 400 ml of toluene and then 0.29 mmoles of bis-cyclopentadienylhafnium dimethyl catalyst and dimethyla-nilinium tetrakis-boron(pentafluorophenyl)$_4$ co-catalyst respectively. The solution temperature was then cooled to 0° C. and 2.3 grams of propylene monomer was added. After 6 minutes of polymerization, the pressure dropped to about 1 psi. The reactor was then evacuated. The vacuum was broken by charging $N_2$ into the reactor until the reactor pressure reached 20 psi. The vacuum/$N_2$ purging procedure was repeated twice to ensure complete removal of the residual propylene.

After vacuum/$N_2$ purging, 1.5 grams of ethylene monomer was charged into the reactor (at 0° C.) and allowed 2 minutes for further reaction. The reactor was then opened and the solution discharged into 2 liters of methanol. The polymer precipitated immediately. The solid polymer was washed several times with methanol and then dried at 60° C. in a vacuum oven. Finally, the solid was washed with hexane to yield a hexane insoluble diblock copolymer of atactic polypropylene and polyethylene. The Fourier transform infrared spectrum of the hexane insoluble diblock copolymer had a doublet at 725 cm$^{-1}$, typical of high density polyethylene as well as to peaks attributable to polypropylene. Gel permeation chromatographic analysis showed this diblock copolymer had a Mn=255,000 with a Mw/Mn=1.93.

The atactic tacticity of the polypropylene-polyethylene copolymers of this invention is shown by the measured value of $T_m$. DSC measurments showed that the atactic polypropylene-polyethylene copolymers of this invention have a single $T_m$ of 119° C. The isotactic polypropylene-polyethylene copolymers known in the art have two values of $T_m$, $T_m$=160° C. and $T_m$=120° C.

B. Preparation of Blend

A mixture of 79.17 wt % isotactic polypropylene (Exxon Chemical PP1012 MFR=8), 19.79 wt % high density polyethylene (Exxon Chemical HDPE 6901) and 1.04 wt % of the diblock polymer prepared above were mixed at 200° C. at 60 rpm for 10 minutes on a Haake-Buchler Rheocord 90.

Small pads were compression molded from each blend, and mini-dumbbells for tensile testing on an Instron were cut from this blend. Also, Izod bars were injection molded and the toughness measured at several temperatures. The properties are given in the Table which follows. Also listed in the Table are similar results obtained from samples prepared according to Comparative Example 1 and 2 which follow.

TABLE

| COMPOSITION (WT %) | EXAMPLE 1 | COMPARATIVE EXAMPLE 1 | COMPARATIVE EXAMPLE 2 |
|---|---|---|---|
| Polypropylene | 79.17 | 80 | 79.17 |
| Polyethylene | 19.79 | 20 | 19.79 |
| Diblock Compatibilizer | 1.04 | 0 | 0 |
| "Reactor Block Polymer" | 0 | 0 | 1.04 |
| TENSILE (25° C. 1"/MIN) | | | |
| E(K$_{psi}$) | 164.0 | 140.2 | 92.8 |
| Eb (%) | 279.8 | 5.18 | 111.0 |
| Wb (in-lb) | 24.7 | 0.273 | 0.559 |
| NOTCHED IZOD IMPACT STRENGTH TOTAL ENERGY (in-lb) | | | |
| 25° C. | .81 | .75 | .42 |
| 0° C. | .38 | .40 | .36 |
| −20° C. | .35 | .30 | .36 |
| −40° C. | .31 | .24 | .36 |

Comparative Example 1

In this comparative example, a blend of 20 wt % polyethylene and 80 wt % polypropylene (same grades as in Example 1) was prepared following the procedure of Example 1 and the same properties obtained in Example 1 for the compatibilizer blend were obtained for this blend. The results are given in the Table above.

Comparative Example 2

In this example, a blend of polyethylene and polypropylene was prepared as outlined in Example 1, however, instead of the diblock copolymer, 1.04% of a so-called "reactor copolymer" sold under the name Profax 8523 by Himont Inc., Wilmington, D.C. The same mechanical properties were measured as for the other two examples, and are given in the Table above. While this polymer improves the toughness of the PE/PP blend, it is clear that the atactic block copolymer is superior in this respect. Moreover, the atactic block polymer made or described herein also is able to increase the stiffness of the blend.

It should be noted that the evacuation and nitrogen purge set forth in Example 1 results in the formation of a diblock copolymer having ethylene segments that are substantially propylene-free. While not wish to be bound by any theory, it is believed that the evacuation and nitrogen purge remove substantially all unreacted propylene monomer prior to the introduction of the ethylene used in completing the diblock copolymer formation. Consequently, little or no propylene is present during ethylene copolymerization, and impurity blocks such as propylene-ethylene blocks cannot form.

What is claimed is:

1. A composition comprising a blend of polyethylene and an isotactic poly-alpha-olefin homopolymer, together with a diblock copolymer compatibilizer of polyethylene block and an atactic poly-alpha-olefin block having no melting point, said isotactic poly-alpha-olefin homopolymer and said atactic poly-alpha-olefin block having the same monomer units, said diblock copolymer compatibilizer being formed by sequentially polymerizing ethylene and alpha-olefin in the presence of at least one metallocene compound and a non-coordinating anion, and the diblock copolymer having terminal unsaturation, at least 30% of which is vinylidene unsaturation.

2. The composition of claim 1 wherein the poly-alpha-olefin has from 2 to about 16 carbon atoms.

3. The composition of claim 2 wherein the compatibilizer is present in the range of from about 0.5 to about 10 wt %.

4. The composition of claim 3 wherein the olefin is propylene.

5. The composition of claim 1 wherein said isotactic poly-alpha-olefin has from 3 to about 16 carbon atoms, said blend of polyethylene and poly-alpha-olefin homopolymer having a ratio of polyethylene to poly-alpha-olefin in the range of 95:5 to 5:95, and the amount of said diblock copolymer being in the range of about 0.5 wt % to about 10 wt % based on the total weight of the blend.

* * * * *